United States Patent [19]

Ehler

[11] 3,752,502

[45] Aug. 14, 1973

[54] PULL TRAILER AND LOAD LIFT MEANS

[75] Inventor: Carl W. Ehler, Deerfield Beach, Fla.

[73] Assignee: Oehler Steel Company, Akron, Ohio

[22] Filed: Jan. 28, 1971

[21] Appl. No.: 110,486

[52] U.S. Cl............ 280/440, 280/425 R, 254/93 HP
[51] Int. Cl............................................. B62d 53/00
[58] Field of Search................ 280/438 R, 439, 440, 280/425 R, 425 A; 254/93 HP; 267/34

[56] References Cited
UNITED STATES PATENTS

| | | | |
|---|---|---|---|
| 3,380,758 | 4/1968 | Granning | 280/438 R X |
| 2,070,960 | 2/1937 | Phillips | 254/93 HP |
| 3,208,770 | 9/1965 | Freitas et al. | 280/440 |
| 3,227,470 | 1/1966 | Funk | 280/440 X |
| 1,745,959 | 2/1930 | Steiner | 254/93 HP X |
| 2,610,824 | 9/1952 | Grier | 254/93 HP |

*Primary Examiner*—Albert J. Makay
*Attorney*—Oldham and Oldham

[57] ABSTRACT

A load supporting and lifting means for a pallet load carrying tractor-trailer assembly. The load bearing plates are supported at the upper ends of an inflatable air bag with a lower end of the bag being supported on the truck or trailer frame. Hinge load carrying plates also connect the edges of the load bearing plates to the frame of the truck or trailer. Breaking cylinders are connected between the hinge plates and the base frame to aid in load release action. The hinge plates are substantially vertically directed when operative and carry a substantial portion of the weight and stabilize the load when it has been lifted by the inflated air bag.

5 Claims, 4 Drawing Figures

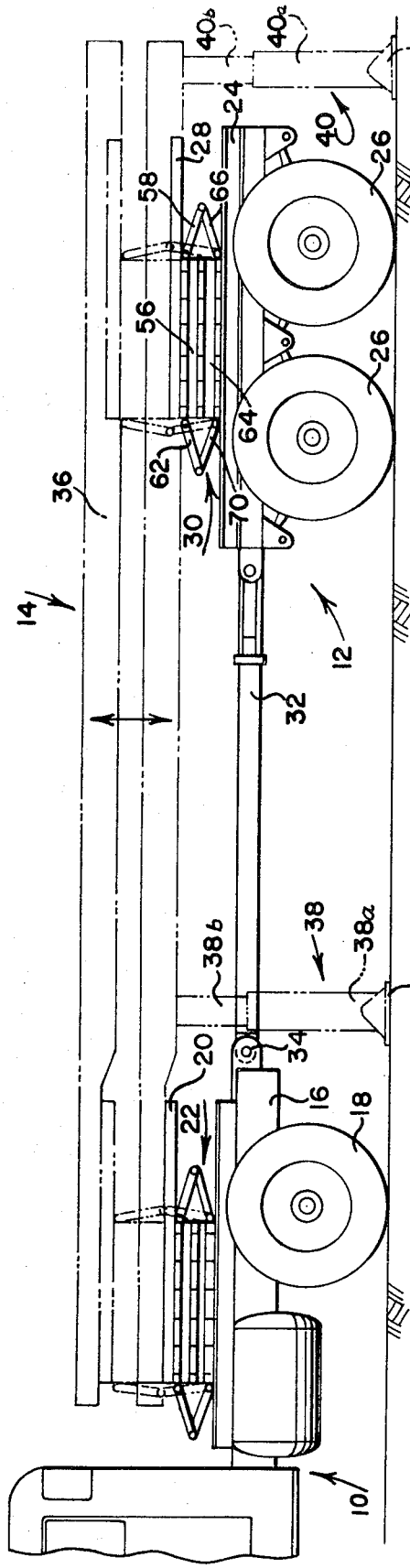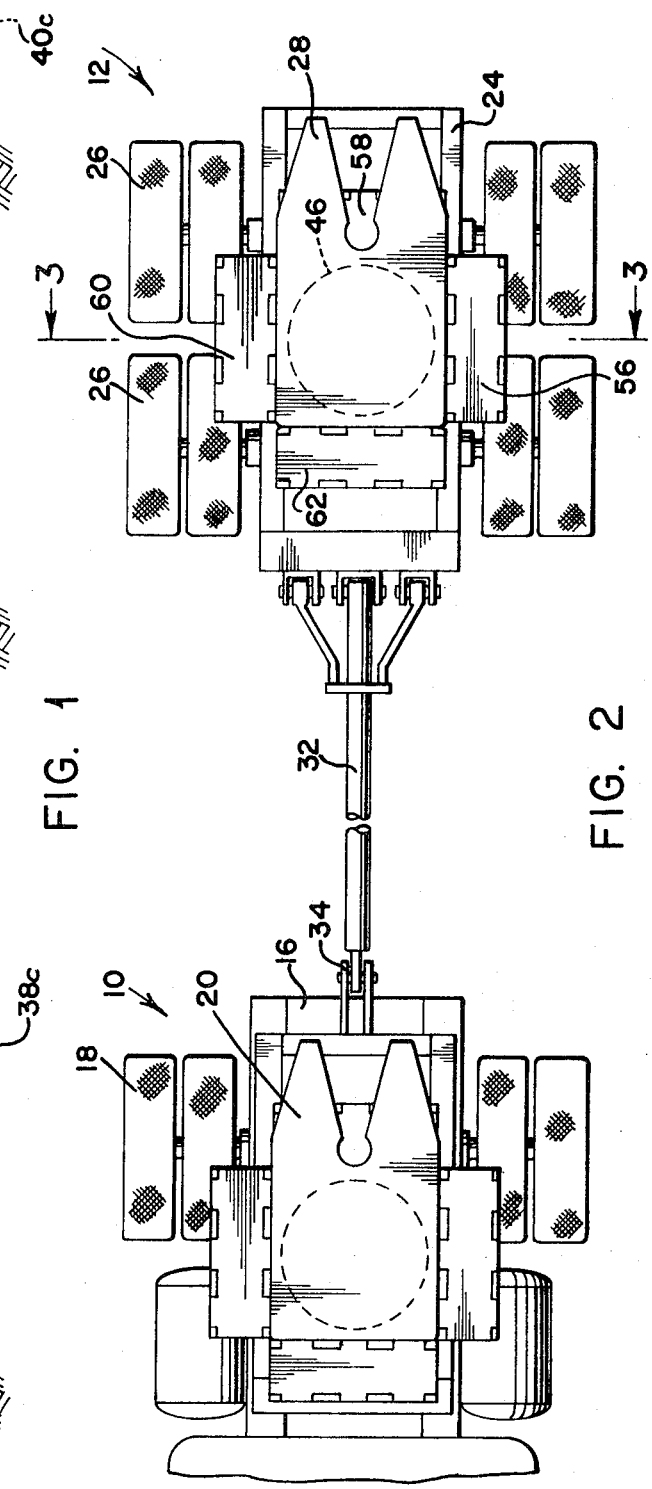

INVENTOR.
CARL W. OEHLER
BY
OLDHAM & OLDHAM
ATTORNEYS

PULL TRAILER AND LOAD LIFT MEANS

The present invention relates to an improved load supporting and lifting device for use with a pallet load carrying tractor-trailer assembly. Tractor-trailer assemblies of this type are shown in my copending application Ser. No. 61,228 for PALLET TYPE LOAD TRANSPORT APPARATUS, filed Aug. 5, 1970. In such an arrangement, sturdy pallets are provided for load support and storage and have retractable legs which position the pallet at a sufficient height so that a trailer may be moved under the pallet. The tractor and trailer each include lifting devices which are then operated to raise the pallet together with its load so that the support legs can be moved to their inoperative position after which the pallet may be lowered onto the tractor and trailer so that it can be transported to a new site.

It is the primary object of the present invention to provide improved load lifting and transport means for tractor-trailer pallet load carrying assemblies.

It is also an object of the invention to provide improved lifting means which have improved lateral stability when supporting the pallet and load.

A further object of the invention is the provision of sturdy load lifting and carrying means which are of uncomplicated, trouble-free construction and operation.

The above and other objects of the invention which will become apparent in the following detailed description are achieved by providing lifting means which consist of an inflatable air bag or enclosure mounted on the truck or trailer frame and supporting a pallet engaging plate on its upper surface. Increased lifting capacity and stability are achieved by providing hinge plates connecting each side of the load supporting plates to the truck or trailer frame. It is also contemplated that breaking cylinders may be connected between the hinge plates and the frame to increase the load carrying capacity and aid in load release action.

For a more complete understanding of the objects and advantages of the invention, reference should be had to the following specification and the accompanying drawings wherein there is shown a preferred embodiment of the invention.

In the drawing:

FIG. 1 is a side elevational view of a tractor-trailer assembly equipped with the load supporting and lifting devices of the present invention, a load supporting pallet being shown in its lower position and in its upper position in dotted outline;

FIG. 2 is a plan view of the tractor-trailer assembly of FIG. 1;

Figure 3:
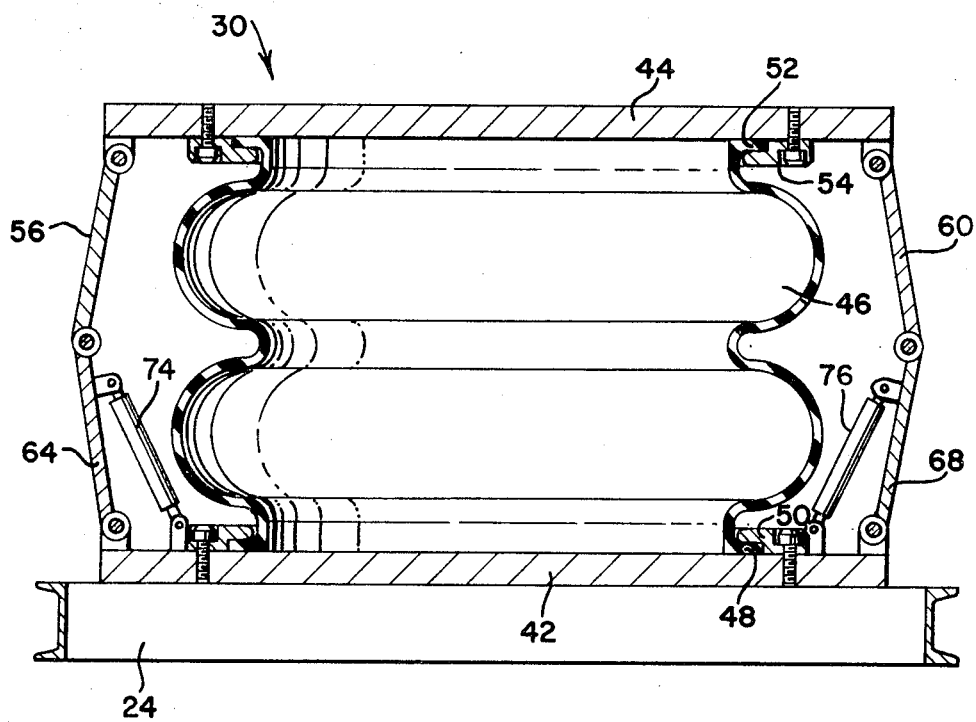
FIG. 3 is an enlarged sectional view taken along the line 3—3 of FIG. 2.

Referring first to FIGS. 1 and 2, the reference numeral 10 designates generally the tractor, the numeral 12 designates the trailer, and the numeral 14 designates the load carrying pallet. The tractor 10 is of conventional construction and has a frame 16 and road-engaging wheels 18. The tractor 10 is provided with a fifth wheel assembly 20 which is supported on the tractor frame 16 by the supporting and lifting device 22 of the present invention.

The trailer 12 has a frame 24 with road engaging wheels 26. A second fifth wheel assembly 28 is supported on the frame 24 by a second supporting and lifting device 30. The trailer 12 is a pole type and is connected to the tractor 10 by a center pole 32. A suitable hitch point 34 is provided on the frame 16 of the tractor 10 for this purpose.

The load supporting pallet 14 may be the type illustrated in the above-mentioned application. The pallet 14 has an enlongated frame 36 which is provided with suitable king pins, not shown, for connection with the fifth wheel assembly 20 of the tractor 10 and the fifth wheel assembly 28 of the trailer 12. Front and rear pairs of supporting legs 38 and 40, respectively, are provided on the sides of the pallet frame 36. Each of the legs 38 and 40 is retractable and may, for example, consist of outer and inner telescoping sections 38a and 38b, respectively, which are held together by pins or other suitable fastening means, not shown. Suitable feet 38c are provided at the lower ends of the legs.

While the lifting and supporting assemblies 22 and 30 will be described in more detail below, it should be understood that each of these assemblies has a collapsed or lowered position, as shown in solid lines in FIG. 1 and an extended or upper position, as shown in dotted outline. Thus the supporting devices 22 and 30 are operable to raise and lower the associated fifth wheel assemblies 20 and 28, respectively, and thus to raise and lower the pallet 14. A pallet 14 is loaded onto the tractor-trailer assembly 10, 12 by positioning the pallet at its upper position with its legs 38 and 40 extended. The trailer 12 and tractor 10 are then maneuvered under the pallet so that the fifth wheel assemblies 20, 28 are aligned with the respective king pins of the pallet 14. It will be understood that suitable channels or other guiding means may be provided on the underside of the frame 36 of the pallet 14 to aid in aligning the king pins and fifth wheel assemblies. When the tractor and trailer have been properly positioned, the lifting devices 22 and 30 are raised to their fullest extent, to engage and lift the pallet, permitting the pallet supporting legs 38 and 40 to be retracted. The tractor 10 and trailer 12 with the pallet 14 may now be moved. When the pallet has been transported to the desired location, the above process is reversed, permitting the tractor 10 and trailer 12 to be removed from under the pallet 14. The tractor and trailer assembly 10, 12 is now free to be loaded with another pallet. If desired, when the legs 38 and 40 are removed or retracted, the devices 22 and 30 are collapsed for load transport.

Figure 4:
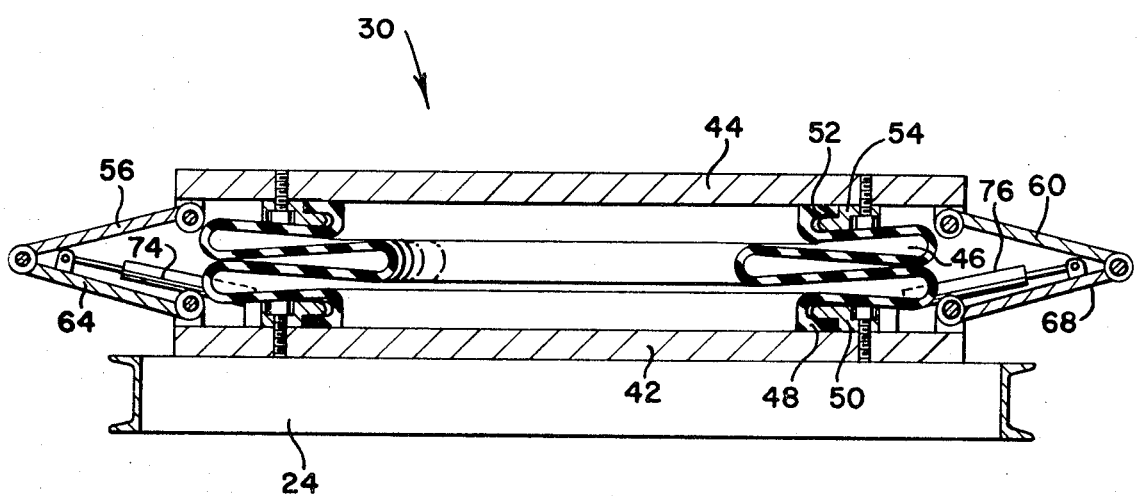
FIG. 4 is a view similar to that of FIG. 3 but showing the load supporting and lifting assembly in its fully collapsed position.

The lifting device 30 of the trailer 12 is illustrated in FIGS. 3 and 4. The device 22 mounted on the tractor 10 is of identical construction. A rectangular or square base plate 42 is mounted on the trailer frame 24. A second square or rectangular plate 44 is mounted on the underside of the fifth wheel assembly 28, not shown in FIGS. 3 and 4. An inflatable air bag 46 is positioned between the base 42 and upper plate 44. The lower end of the air bag 46 has an annular rib 48 which is clamped by conventional means such as a clamping ring 50 to the base 42. The upper end of the air bag 46 has an annular rib 52 which is secured to the upper plate 44 by a second clamping ring or equivalent device 54. The ribs 48 and 52 with the associated clamping rings 50 and 54 form air-tight seals between the air bag 46 and the base 42 and top plate 44, respectively. While not shown, a suitable port is provided, for example in the base plate 42, to permit compressed air to flow into or out of the interior of the air bag 46. Also, suitable controlling means are provided to regulate the flow of air into or out of the interior of the air bag 46 so that the device may be selectively raised or lowered. It should be noted, as shown in FIG. 3, that the cross-sectional configuration of the air bag 46 is usually that of a flattened figure eight. This configuration is of importance as it permits the side walls of the air bag 46 to fold smoothly when the bag is collapsed, as is shown in FIG. 4. It should also be noted that the air bag 46 is of a large diameter to contribute to the stable load lifting and supporting properties of the device.

Further load supporting and stabilizing action is achieved by a hinge plate arrangement connecting the base plate 42 and the upper or fifth wheel support plate 44. This arrangement consists of plates 56, 58, 60 and 62 which are hinged to the lateral edges of the upper plate 44, one of the hinge plates 56 to 62 being provided along each side of the top plate 44 with each of the plates extending substantially the full length of the top plate 44 and extending generally downwardly therefrom. Additional hinge plates 64, 66, 68 and 72 are provided on each of the four edges of the base plate 42, with one of the hinge plates 64 to 72 being provided along each side of the base plate 42 and extending substantially the entire length thereof. The upper and lower hinge plates on the corresponding sides of the top plate 44 and the base plate 42 are connected together by suitable piano-type hinge connection. Breaking cylinders 74 and 76 preferably are connected between the base plate 42 and each of a pair of opposed lower hinge plates 64 and 68, the connections to the hinge plates being made adjacent their upper ends. As can be seen from FIG. 3, when the air bag 46 is fully inflated, raising the top plate 44 to its upper position the pairs of hinge plates meet at an angle usually only slightly less than 180° but which may be a full 180° so that the pairs of plates form nearly a straight line. Usually the breaking cylinders 74 and 76 are locked while the hinge plates are in this position, and because of the friction on the hinge means a substantial portion of the weight carried by the top plate 44 can be transmitted to the base plate 42 and trailer frame 24 through the hinge plate arrangement. Obviously, other arrangements may be provided to achieve this locking of the hinge plates. It will be readily apparent that since the hinge plate assemblies extend along substantially the entire length of each side of the base plate 42 and top plate 44, these hinge plate arrangements assure the uniform and stable upward and downward movement of the top plate 44, maintaining this top plate in a parallel relation to the base plate 42. Thus, even if the top plate 44 is unevenly loaded, uniform raising and lowering of the top plate 44 and the load carried thereby is assured.

The box-like assembly of the various hinge plates aids in stable load support and transport action. Then actuation of the cylinders 74 and 76 aids in obtaining an air bag release and pallet lowering action, the pallet support legs being operably positioned before, of course. The tractor and trailer then may pull out from under a pallet and be used for other pallet transfer jobs. A stable, sturdy load lift and lower unit has been provided by the invention.

It should be understood that, while in accordance with the Patent Statutes, only the best known embodiment of the invention has been described and illustrated in detail, the invention is not so limited and various modifications and additions thereto may be made. Reference should therefore be had to the appended claims in determining the true scope of the invention.

What is claimed is:

1. A fifth wheel supporting and elevating device on a tractor-trailer combination adapted to receive and transport load bearing pallets, comprising:

a base plate secured to a frame in the tractor-trailer combination;

a top support plate;

a large diameter vertical axis inflatable tubular air bag positioned between the top and base plates, the ends of the air bag being hermetically sealed to the base and top plates, respectively, to raise and lower the top plate dependent on the pressure set up within the air bag, a plurality of elongated first hinge leaves, one edge of each leaf being hinged to the top plate and extending generally downwardly therefrom;

a plurality of elongated second hinge leaves, one edge of each such leaf being hinged to the base plate and extending generally upwardly therefrom, respective ones of the first and second leaves being hingedly engaged with one another, and four sets of the hinge leaves being provided and with the sets being positioned in two opposed pairs to surround the air bag, and said sets of hinge leaves continually maintaining said top plate parallel to said base plate as the top plate is moved vertically by said air bag and stabilizing said top plate at all times against any movement laterally in any direction in relation to the vertical axis of said air bag.

2. A supporting and elevating device according to claim 1 and comprising at least one breaking cylinder means connected at one end thereof to one of a set of the hinge leaves and at its opposite end to one of the plates to aid in starting folding of the sets of hinge leaves from an opened position, the sets of hinge leaves being movable to substantially a 180° internal angle when the tubular structure is fully inflated.

3. A combination as in claim 2 where two axially spaced load support means are provided in the tractor-trailer combination and each elevating device includes an inflatable tubular structure and sets of hinge leaves as in claim 16.

4. Apparatus according to claim 2 where the four sets of hinge leaves form the sides of a square surrounding the air bag.

5. A device as in claim 2 where said base plate is attached to the wheel support frame of a trailer, and said top plate is a fifth wheel structure adapted to engage with a king pin on a load support pallet.

* * * * *

UNITED STATES PATENT OFFICE
CERTIFICATE OF CORRECTION

Patent No. 3,752,502              Dated August 14, 1973

Inventor(s) Carl W. Oehler

It is certified that error appears in the above-identified patent and that said Letters Patent are hereby corrected as shown below:

In the identification section [75] of Page 1 of this patent the name of the inventor should be changed from "Carl W. Ehler"

to -- Carl W. Oehler --

Signed and sealed this 20th day of November 1973.

(SEAL)
Attest:

EDWARD M. FLETCHER, JR.
Attesting Officer

RENE D. TEGTMEYER
Acting Commissioner of Patents